(12) United States Patent
Joshi et al.

(10) Patent No.: US 9,732,670 B2
(45) Date of Patent: Aug. 15, 2017

(54) TUNED CAVITY ROTATING DETONATION COMBUSTION SYSTEM

(71) Applicant: GENERAL ELECTRIC COMPANY, Schenectady, NY (US)

(72) Inventors: Narendra Digamber Joshi, Schenectady, NY (US); Michael Solomon Idelchik, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 643 days.

(21) Appl. No.: 14/103,928

(22) Filed: Dec. 12, 2013

(65) Prior Publication Data

US 2015/0167544 A1 Jun. 18, 2015

(51) Int. Cl.
*F02B 53/04* (2006.01)
*F23R 7/00* (2006.01)

(52) U.S. Cl.
CPC ............... *F02B 53/04* (2013.01); *F23R 7/00* (2013.01)

(58) Field of Classification Search
CPC .. F23C 15/00; F23R 7/00; F02B 53/04; F02C 3/165; F02C 5/02
See application file for complete search history.

(56) References Cited

U.S. PATENT DOCUMENTS

| 2,731,795 | A |   | 1/1956 | Bodine, Jr |
|---|---|---|---|---|
| 5,123,835 | A | * | 6/1992 | Richards ............... F23C 15/00 122/24 |
| 6,449,939 | B1 |   | 9/2002 | Snyder |
| 6,584,765 | B1 | * | 7/2003 | Tew ...................... B64G 1/401 60/247 |
| 7,367,194 | B2 |   | 5/2008 | Murayama et al. |
| 7,621,118 | B2 |   | 11/2009 | Snyder et al. |
| 7,836,682 | B2 |   | 11/2010 | Rasheed et al. |

(Continued)

FOREIGN PATENT DOCUMENTS

GB        1333705 A    10/1973

OTHER PUBLICATIONS

European Search Report and Opinion issued in connection with corresponding EP Application No. 14197240.6 on Apr. 29, 2015.

*Primary Examiner* — Arun Goyal
(74) *Attorney, Agent, or Firm* — John P. Darling

(57) ABSTRACT

A tuned cavity rotating detonation combustion system includes a an annular chamber having an inlet and an outlet; a valve plate at the inlet of the annular chamber and comprising a plurality of openings spaced circumferentially around the inlet; a plurality of tubes each having an open end in communication with a corresponding opening of the valve plate and a closed end forming a tuned cavity, and a first opening between the open end and the closed end for injection of air; and a plurality of fuel injectors corresponding to the plurality of tubes, each fuel injector being configured to inject fuel into the tube between the first opening and the open end. Each of the tuned cavities has a length sized to resonate at a same frequency as a continuous detonation frequency of at least one detonation wave in the annular chamber. Alternately, or additionally, a plurality of flame arresters corresponding to the plurality of tubes are configured to arrest the at least one detonation wave generated in the detonation chamber from travelling into the tube.

34 Claims, 5 Drawing Sheets

(56) References Cited

U.S. PATENT DOCUMENTS

| | | | |
|---|---|---|---|
| 7,950,219 B2* | 5/2011 | Tangirala | F02K 3/06 |
| | | | 60/247 |
| 8,127,533 B2 | 3/2012 | Lu et al. | |
| 8,539,752 B2* | 9/2013 | Brumberg | F23R 7/00 |
| | | | 431/1 |
| 8,683,780 B2* | 4/2014 | Shimo | F02C 3/165 |
| | | | 431/1 |
| 9,046,058 B2* | 6/2015 | Claflin | F02C 3/14 |
| 2005/0279078 A1 | 12/2005 | Dean et al. | |
| 2012/0151898 A1 | 6/2012 | Claflin | |
| 2012/0204534 A1 | 8/2012 | Kenyon et al. | |

* cited by examiner

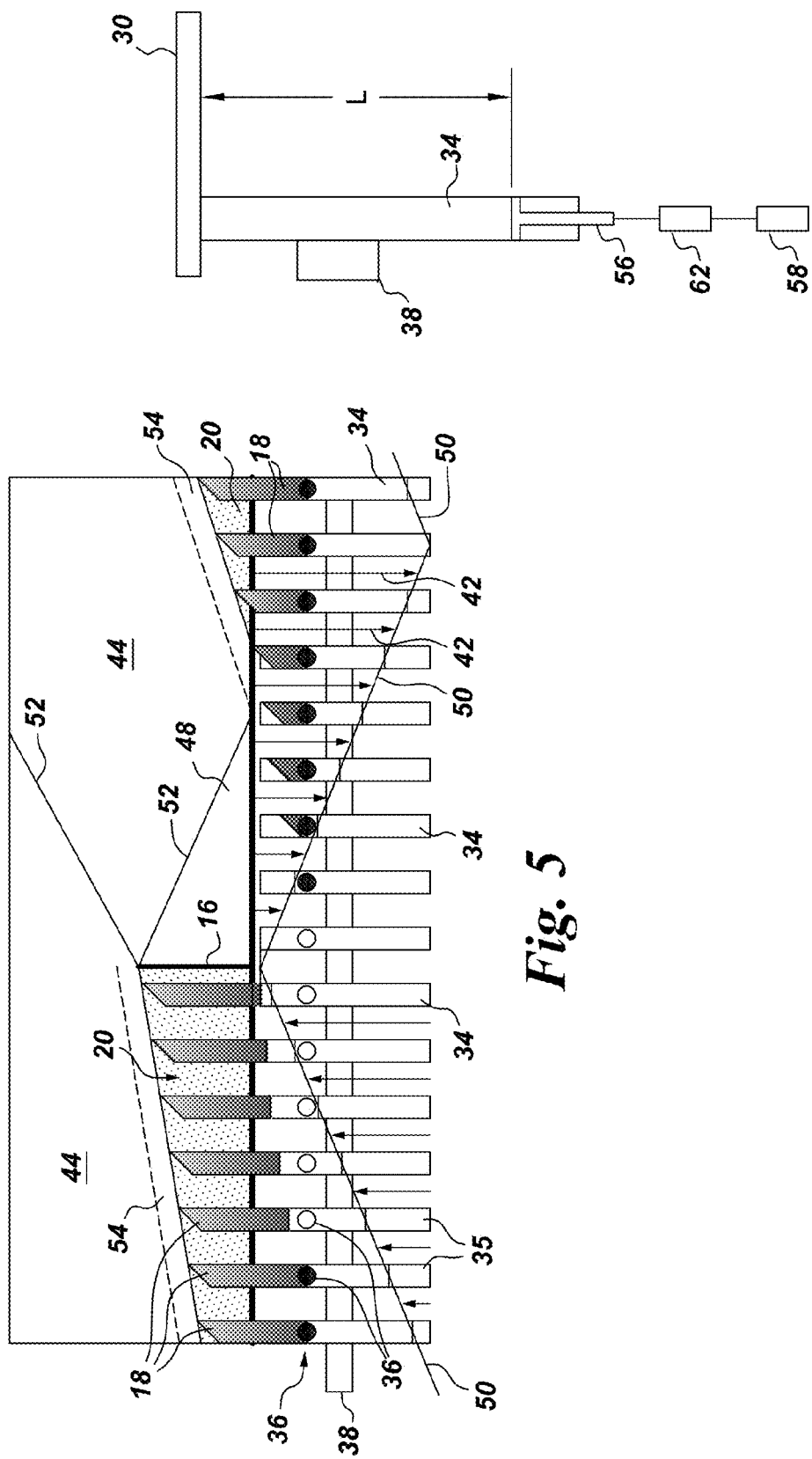

TUNED CAVITY ROTATING DETONATION COMBUSTION SYSTEM

BACKGROUND

The present technology relates generally to tuned cavity rotating detonation pressure gain combustion systems, and more particularly, to a system for liquid fuel injection into a tuned cavity rotating detonation combustion system.

Rotating, or continuous, detonation pressure gain combustion systems are expected to have significant advantage over pulse detonation pressure gain combustors as the net non-uniformity of flow entering the turbine is expected to be lower by a factor of 2-10. One of the limitations of a rotating detonation combustor is inlet valving. The inlet valving has to work at kilohertz frequency range rather than the tens of hertz frequency range of the pulse detonation combustors. Mechanical valves that operate at such high frequencies are not practical.

BRIEF DESCRIPTION

In accordance with one example of the technology disclosed herein, a rotating detonation combustion system comprises an annular chamber having an inlet and an outlet; a valve plate at the inlet of the annular chamber and comprising a plurality of openings spaced circumferentially around the inlet; a plurality of tubes each having an open end in communication with a corresponding opening of the valve plate and a closed end forming a tuned cavity, and a first opening between the open end and the closed end for injection of air; and a plurality of fuel injectors corresponding to the plurality of tubes, each fuel injector being configured to inject fuel into the tube between the first opening and the open end, wherein each of the tuned cavities has a length sized to resonate at a same frequency as a continuous detonation frequency of a detonation wave in the annular chamber.

In accordance with another example of the technology disclosed herein, a rotating detonation combustion system comprises a detonation chamber having an inner wall, an outer wall, an inlet and an outlet; a valve plate at the inlet of the annular chamber and comprising a plurality of openings spaced around the inlet; a plurality of tubes each having an open end in communication with a corresponding opening of the valve plate and a closed end forming a tuned cavity, and a first opening between the open end and the closed end for injection of a fuel/air mixture; and a plurality of flame arresters corresponding to the plurality of tubes, each flame arrester being configured to arrest at least one detonation wave generated in the detonation chamber from travelling into the tube, wherein each of the tuned cavities has a length sized to resonate at a same frequency as an effective continuous detonation frequency of at least one detonation wave in the annular chamber.

In accordance with another example of the technology disclosed herein, a method of combustion comprises introducing a plurality of fuel/air plumes into an annular chamber from a plurality of tubes at in inlet side of the annular chamber, each of the plurality of tubes having an open end at the inlet side and a closed end opposite the open end forming a tuned cavity; and igniting a fuel/air mixture formed by the plumes to generate a detonation wave in the annular chamber, wherein each of the tuned cavities has a length sized to resonate at a same frequency as a continuous detonation frequency of a detonation wave in the annular chamber.

Referring to FIG. 1, a current rotating detonation combustor 2 includes an annulus having an outer wall 8 and an inner wall 10. The annulus 8, 10 has an inlet end 4 in which a fresh fuel/air mixture 20 enters and an outlet end 6 from which an exhaust flow 22 exits. A detonation wave 16 travels in the circumferential direction 17 of the annulus 8, 10 consuming the incoming fuel/air mixture 18 and providing a high pressure region 14 in an expansion region 12 of the combustion. The burned fuel/air mixture (i.e. combustion gases) 19 exit the annulus 8, 10 and are exhausted with the exhaust flow 22. The region 14 behind the detonation wave 16 has very high pressures and this pressure can feed back into an upstream chamber from which the air and fuel are introduced and form an unburnt fuel/air mixture 20. Current designs of rotating detonation combustion systems attempt to overcome the inlet valve limitation by increasing the pressure drop across the valve to a 20% to 50% range to prevent the detonation pressure wave 16 from travelling into the incoming fuel/air mixture 18 and to ensure that the fuel/air mixture 18 flow does not reverse in the region following the detonation wave. However, this compromises the benefits of pressure gain of the detonation wave phenomena.

DRAWINGS

These and other features, aspects, and advantages of the present technology will become better understood when the following detailed description is read with reference to the accompanying drawings in which like characters represent like parts throughout the drawings, wherein:

FIG. 1 schematically illustrates a current rotating detonation combustor;

FIG. 2 schematically illustrates a tuned cavity rotating detonation combustion system according to one example of the present invention;

FIG. 3 is a cross-sectional view of the tuned cavity rotating detonation combustion system along line 3-3 of FIG. 2;

FIG. 4 schematically illustrates a perspective view of the tuned cavity rotating detonation combustion system of FIG. 2;

FIG. 5 schematically illustrates the working principle of the tuned cavity rotating detonation combustion system of FIGS. 2-4;

FIG. 6 schematically illustrates a tuned cavity according to another example of the present invention;

FIG. 7 schematically illustrates a tuned cavity rotating detonation combustion system according to another example of the present invention;

FIG. 8 schematically illustrates a flame arrester configuration for a tuned cavity rotating detonation combustion system according to an example of the present invention;

FIG. 9 schematically illustrates a flame arrester configuration for a tuned cavity rotating detonation combustion system according to an example of the present invention;

FIG. 10 schematically illustrates a flame arrester configuration for a tuned cavity rotating detonation combustion system according to an example of the present invention;

DETAILED DESCRIPTION

Figure 1:
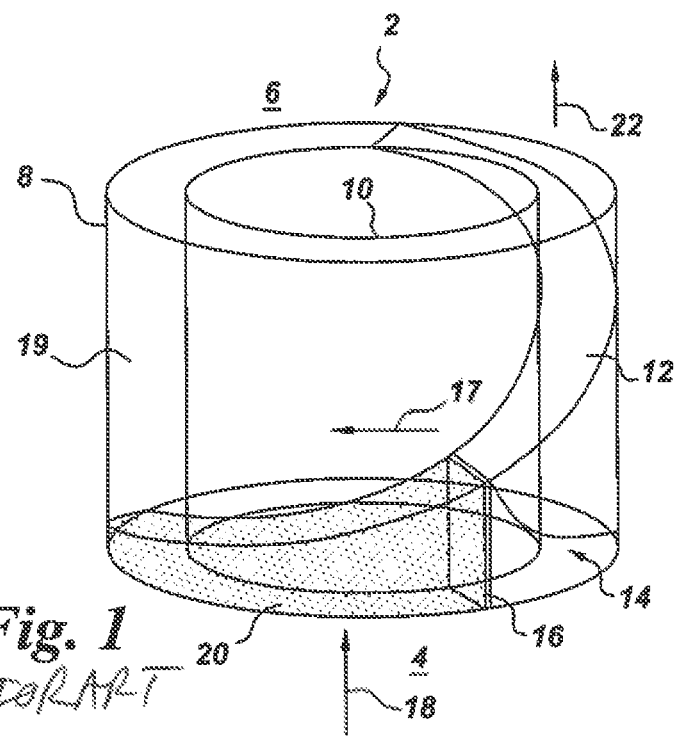
Figure 2:
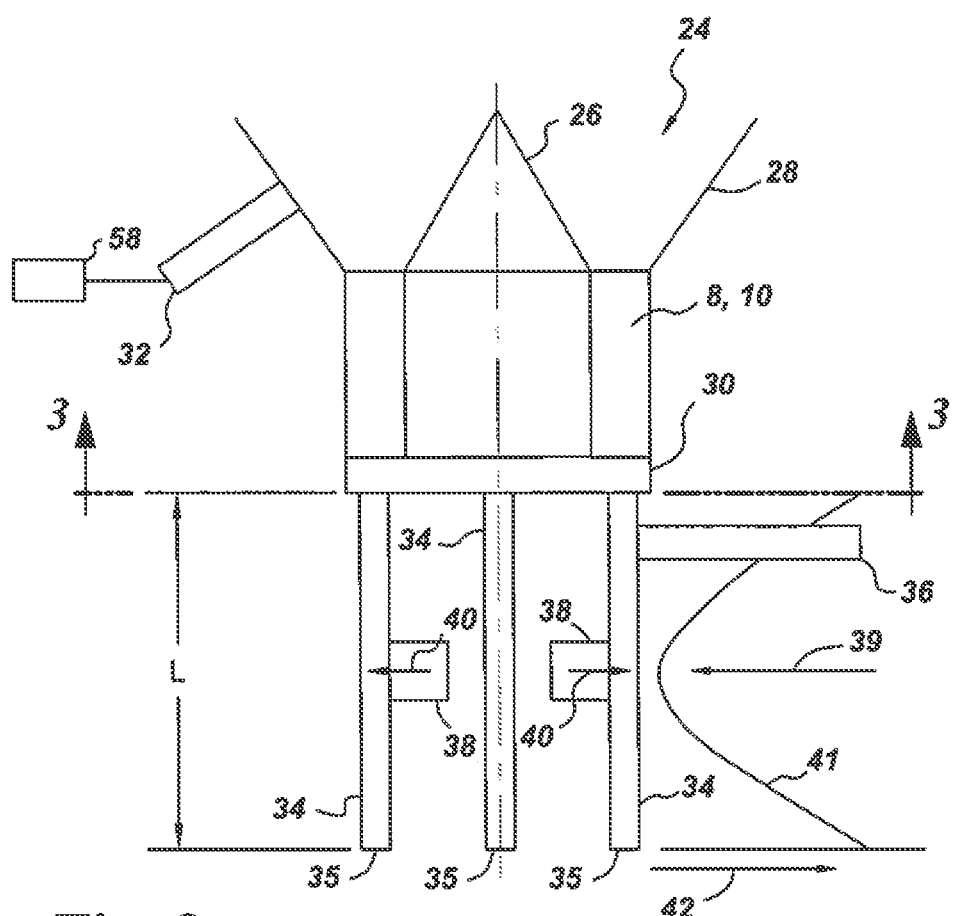
Figure 3:
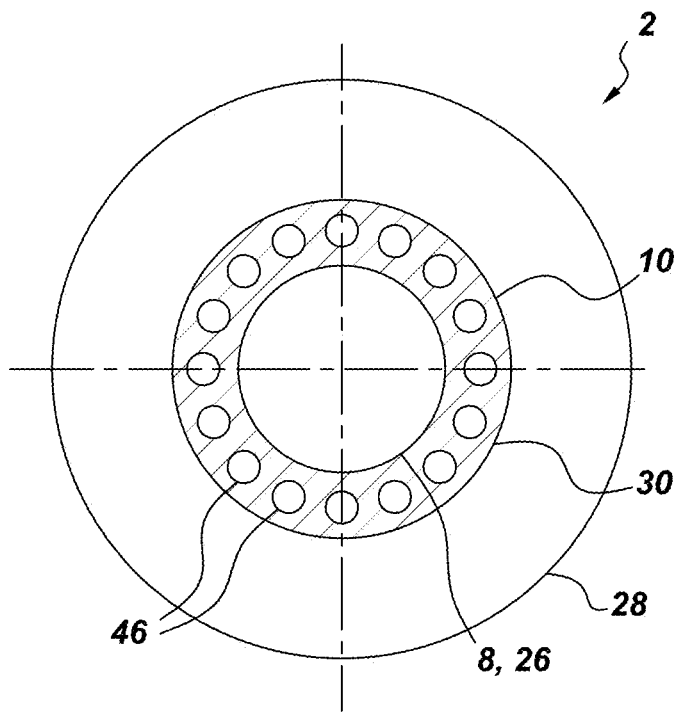

Referring to FIGS. 2-5, a rotating detonation combustion system 2 according to an example of the present technology may include a rotatable detonation annulus having an outer wall 8 and an inner wall 10. It should be appreciated that the walls 8, 10 of the annulus may form a cylindrical annulus as shown in FIG. 1, but that walls 8, 10 may also be curved, or may define a conical annulus. As shown in FIGS. 2 and 3, a stationary valve plate 30 with a plurality of holes 46 corresponding to a plurality of tubes 34 is positioned adjacent to the inlet end of the annulus 8, 10 and an exhaust nozzle 24 is provided to the exit end of the annulus 8, 10. The exhaust nozzle 24 may include an outer wall 28 and an inner wall 26 configured to direct the exhaust from the annulus 8, 10. An igniter 32 may be provided in the outer wall 28 to ignite the fuel/air mixture to provide combustion gases. Although one igniter 32 is shown in the drawing, it should be appreciated that more than one igniter may be provided. The operation of the igniter(s) 32 may be controlled by a controller 58. The controller 58 may be a computer processor or other logic-based device, software components (e.g., software applications), and/or a combination of hardware components and software components (e.g., a computer processor or other logic-based device and associated software application, a computer processor, or other logic-based device having hard-wired control instructions, or the like).

Figure 4:
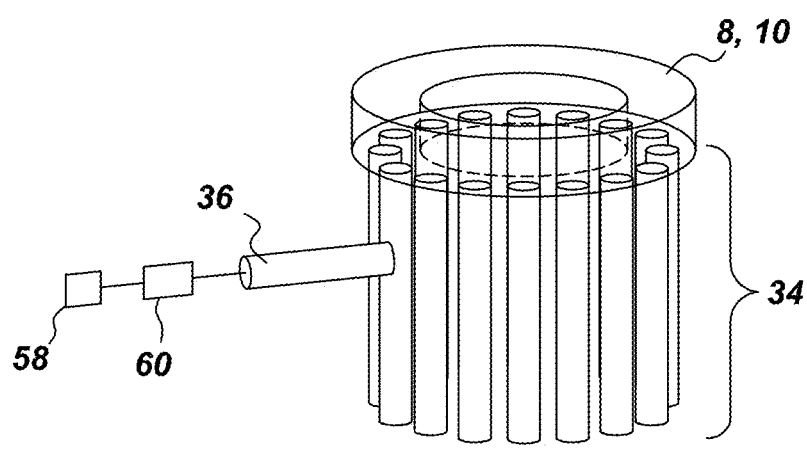

As shown in FIG. 4, the plurality of tubes 34 are distributed circumferentially around the inlet end of the annulus 8, 10 and are closed at ends 35 as shown in FIGS. 2 and 5 to form tuned cavities. Although the tubes 34 are shown in FIG. 4 as having a circular cross section, it should be appreciated that other cross sectional shapes, for example, rectangular, may be used. The length L of the tuned cavity is designed to reflect a pressure wave from the detonation to reach the inlet of the rotating annulus 8, 10 to coincide with the approach of the next detonation wave. Fuel injectors 36, for example liquid fuel injectors, are connected to each of the tuned cavity tubes 34 and supported by a fuel manifold (not shown). It should be appreciated that for clarity, only one fuel injector 36 is shown in FIGS. 2 and 4, and that in FIG. 4 the fuel and air manifolds 38 are omitted for clarity. The tubes 34 are supported by the air manifold 38 and air 40 is injected into the tuned cavity tubes 34 at pressure antinodes 39 in the tubes 34. As shown in FIG. 2, a static pressure 41 in the tube 34 is formed from sound pressure that increases in the direction shown by arrow 42. The static pressure is lowest at the pressure antinode 39 where the injected air 40 is introduced to the tube 34 (i.e. where the velocity of the injected air 40 is highest) and the static pressure is highest at the closed end 35 of the tube 34 and at the entrance to the stationary valve plate 30 (i.e. where the velocity of the air and the air/fuel mixture is lowest). It should be appreciated that the injected air 40 may be introduced into the tubes 34 in a continuous stream and does not need to be turned on and off or otherwise cycled. The injectors 36 may be configured to inject fuel into the air 40 to create mixtures with an equivalence ratio between about 0.4 to about 1.4.

The fuel injectors 36 are turned on and off by valves 60 under the operation of the controller 58 with a specific phased relationship of the detonation wave(s) 16 rotating in the detonation annulus 8, 10. In particular, the length L of the tubes 34 is sized to resonate at the same frequency as a continuous detonation frequency. It should be appreciated that the continuous detonation frequency is the effective frequency of the detonation wave or waves in the chamber. For example, if there is a single detonation wave in the chamber, the effective continuous detonation frequency is the frequency of the single wave. However, if multiple detonation waves are in the chamber, the effective continuous detonation frequency is that multiple times the frequency of a single wave. For example, if two continuous detonation waves each having a frequency of 1 kHz are in the chamber, the effective frequency is 2 kHz.

The fuel injector 36 injects fuel, for example liquid fuel, in short, timed bursts to coincide with the forward propagating detonation pressure wave(s) 16. Referring to FIG. 5, the fuel injectors 36 are turned on (indicated by the solid circle) and off (indicated by the non-solid circle) in sequence to develop a combustible mixture 20 for the detonation wave(s) 16 to propagate into. The pattern of the fuel injectors 36 that are turned on rotates in synchronization with the detonation wave(s) 16 with an appropriate phase lag. As shown to the left in FIG. 5, a fuel/air mixture 18 plume emanating from each tube 34 makes up the combustible mixture for the detonation wave(s) 16 to propagate into. As shown to the left and right in FIG. 5, buffer air 54 separates the incoming fresh fuel/air mixture 18 plume from a high temperature burned gas region 44 defined by expansion fans 52. A high pressure region 48 exists behind the detonation wave(s) 16, which is the same as the high pressure region 14 in FIG. 1, and a pressure wave 50 is generated in the tubes 34.

Referring to the lower left portion of FIG. 5, some of the fuel injectors 36 below the fresh fuel/air mixture 20 are turned off to ensure that the airflow underneath the detonation annulus 8, 10 is unfueled. This ensures that the flame does not propagate into the mixing section when the detonation wave 16 passes by. Referring to the lower middle portion of FIG. 5, some of the fuel injectors 36 behind the detonation wave 16 are turned on at an appropriate time with respect to the propagating detonation wave 16 to inject fuel into the airstream such that the mixture propagates into the detonation annulus 8, 10. The tuned cavity tubes 34 are designed to reflect and return the pressure wave 50 in phase with the detonation wave 16 which reduces, or eliminates, ingestion of burned mixture into the inlet cavities. By utilizing the tuned cavities 34 at the inlet to the combustion system, the pressure energy in the detonation wave 16 is reflected back into the inlet plane of the combustor to reduce the pressure drop requirements of the system. It should also be appreciated that the controller 58 may turn alternate fuel injectors 36 on and off to throttle the combustion system.

Referring to FIG. 6, in an alternate/additional feature of the present technology, a piston 56 is provided with a control system to change the tuned length L of the cavity tubes 34 to match the detonation frequency as the inlet mixture temperature changes with operating conditions amongst other things that could change the rotating detonation frequency. The position of the piston 56 may be adjusted by an actuator 62 that is controlled by the controller 58. The actuator 62 may be, for example, a linear motor, a screw drive, or a hydraulic piston. The tuned length of the tube 34 may be changed to account for changes in the inlet mixture temperature and the detonation frequency.

Figure 7:
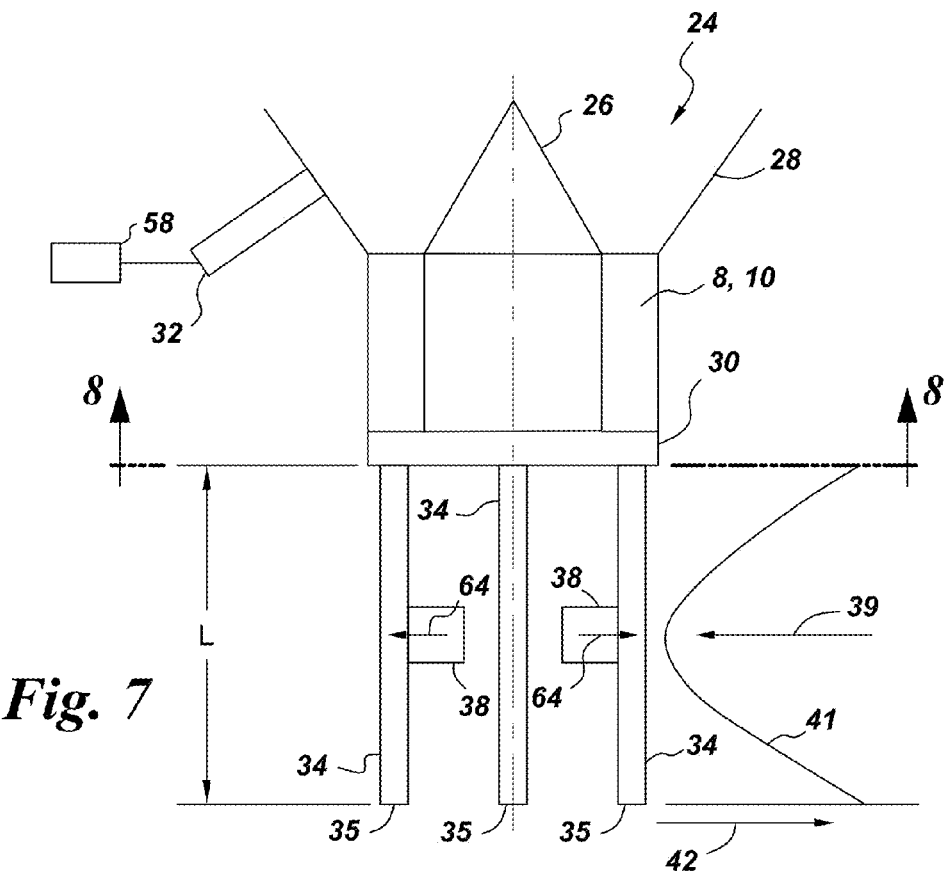

Referring to FIG. 7, a tuned cavity rotating combustion system according to another example does not include fuel injectors. Instead, a fuel/air mixture 64 is introduced into each tube 34 at a pressure antinode 39 of the static pressure wave 41 in the tube 34. The fuel/air mixture 64 may be a lean mixture and its composition may be controlled by the controller 58. The fuel/air mixture 64 may be continuously introduced into the tubes 34. In other words, the fuel/air mixture 64 may be fed into the tubes 34 without the use of injectors or valves that are turned on and off (opened and closed). Of course, the source of the fuel/air mixture 64 may be turned on and off to initiate and end the supply of the mixture as needed to control the operation of the combustion system, but in the combustion system shown in FIG. 7 no injectors or valves are necessary to control the flow of the mixture 64 from its introduction into the tubes 34 from the manifold 38 and into the combustion chamber from the tubes 34.

Figure 8:
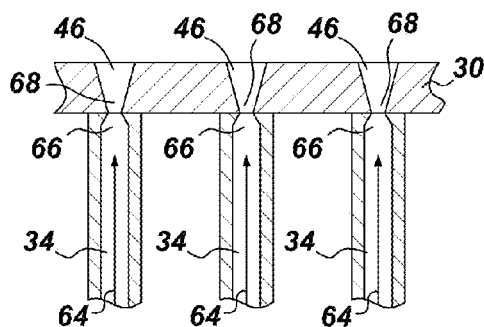

Referring to FIG. 8, in order to prevent the combustion wave(s) from entering into and travelling down the tubes 34, the ends of the tubes 34 adjacent the valve plate 30 may have a converging opening 66. The holes 46 in the valve plate 30 may have diverging openings 68. The converging openings 66 at the end of the tubes 34 and the diverging openings 68 of the openings 46 in the valve plate 30 operate as flame arresters to prevent the detonation wave(s) from entering and travelling into the tubes 34. As discussed above with respect to FIG. 5, the tuned cavity tubes 34 are designed to reflect and return the pressure wave in phase with the detonation wave(s) 16 which reduces, or eliminates, ingestion of burning or burned mixture into the inlet cavities.

Figure 9:
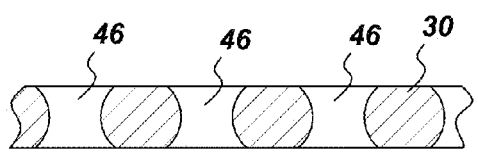
Figure 10:
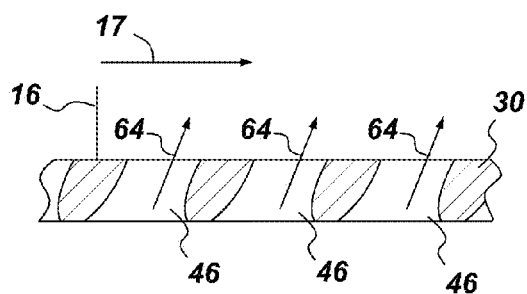

Referring to FIG. 9, in accordance with another example, the valve plate 30 may include openings 46 that include converging and diverging sections, e.g. are hour glass shaped. The openings 46 act as flame arresters in a manner similar to that discussed above with respect to FIG. 8. Referring to FIG. 10, the openings 46 in the valve plate 30 may include converging and diverging sections similar to those in FIG. 9. Additionally, the openings 46 may be provided to inject the fuel/air mixture 64 at an acute angle to the propagation 17 of the detonation wave(s) 16 to impart momentum to the mixture 64 entering the detonation chamber. The valve plate 30 may also have a thermal barrier coating (TBC) applied to its surface to protect the valve plate from the temperature of the detonation wave(s) 16. It should be appreciated that the flame arresters shown in FIGS. 8-10 may also be used in the combustion systems shown in FIGS. 2-6. It should also be appreciated that the closed ends 35 of the tubes 34 may have cross sections that are smaller or larger than the openings 46 in the valve plate 30.

Figure 11:
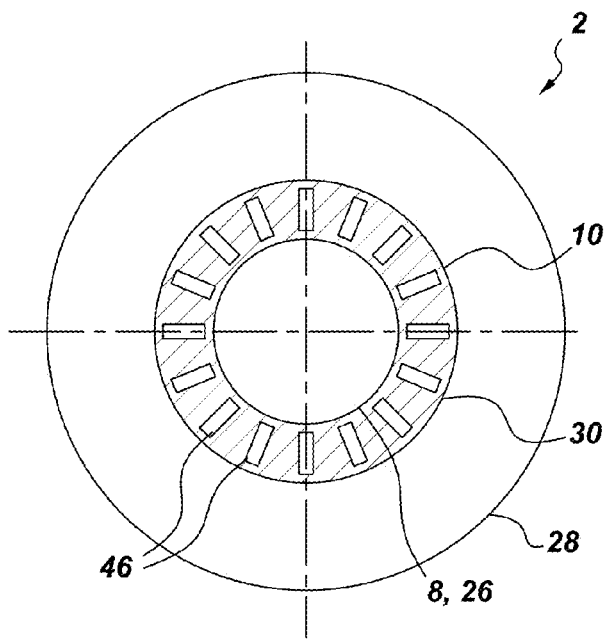
FIG. 11 is a cross-sectional view of a valve plate of a tuned cavity rotating detonation combustion system according to an example of the present invention along line 8-8 as shown in FIG. 7.

The openings 46 in the valve plate 30 may have a shape other than circular as shown in FIG. 3. Referring to FIG. 11, the openings 46 in the valve plate may have, for example, a rectangular or square shape. Other shapes are also possible, including for example oval or elliptical or other polygonal shapes.

Figure 12:
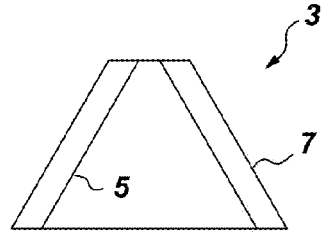
FIG. 12 is a schematic illustration of a detonation chamber according to an example of the present invention.
Figure 13:
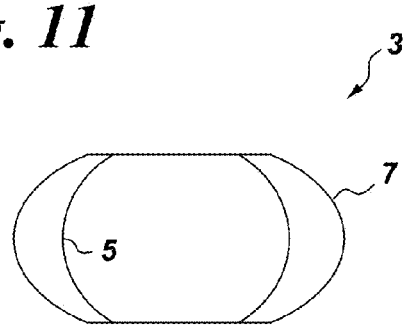
FIG. 13 is a schematic illustration of a detonation chamber according to an example of the present invention.
Figure 14:
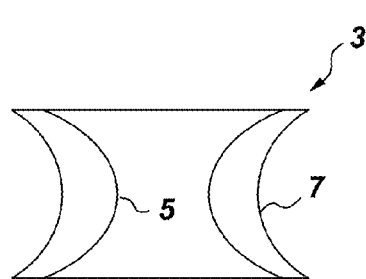
FIG. 14 is a schematic illustration of a detonation chamber according to an example of the present invention.
Figure 15:
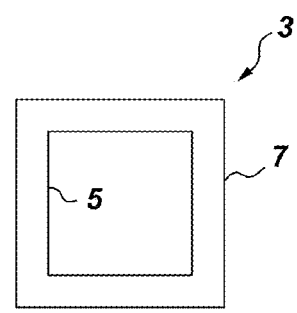
FIG. 15 is a schematic illustration of a detonation chamber according to an example of the present invention.

The combustion chamber may also have a shape other than annular as shown in FIG. 2. Referring to FIG. 12, a combustion chamber 3 having a conical shape defined by an inner wall 5 and an outer wall 7, which correspond to the inner and outer walls 8, 10 of FIG. 1, may be used in the combustion systems described herein. As shown in FIGS. 13 and 14, the combustion chamber may have curved inner and outer walls 5, 7 that are either concave or convex, respectively. Polygonal combustion chambers 3 are also possible for use with the combustion systems described herein. For example as shown in FIG. 15, a combustion chamber 3 may have a square shape defined by inner and outer walls 5, 7. Other polygonal shapes, for example rectangular, may also be used.

By utilizing the tuned cavities at the inlet to the combustion system, the pressure energy in the detonation wave is reflected back into the inlet plane of the combustor to reduce the pressure drop requirements of the system. The tuned cavity rotating detonation combustion system may release ten times the amount of heat per unit volume in comparison to standard combustion systems. Thus a combustor made with the rotating detonation technology may be substantially smaller than a conventional combustion system. The present technology also allows liquid fuel to be injected into the incoming air stream to create a mixture in which the detonation will propagate. The specific arrangement of the injectors along with a control system will enable a liquid fueled system that will not have the auto-ignition issue which can limit the upper temperature limit for the incoming air for previously disclosed rotating detonation combustion systems.

In addition the tuned cavity rotating detonation combustion system of the present technology may result in a pressure gain and thus improved fuel burn of up to 5% in a modern high pressure ratio gas turbine engines. These advantages may be very significant to both military and commercial gas turbine engines. The present technology may also be used to design compact augmentors for gas turbine engines and ram burners for missiles or rockets as well, for example as shown in FIG. 2. It should be appreciated that instead of the exhaust nozzle 26, 28 as shown in FIG. 2, in the case of the rotating detonation combustion system used in a gas turbine engine, the exhaust gases of the system may be used to drive a high pressure turbine.

It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the present technology have been illustrated and described herein, many modifications and changes will occur to those skilled in the art. It is, therefore, to be understood that the appended claims are intended to cover all such modifications and changes.

The invention claimed is:

1. A rotating detonation combustion system, comprising:
   an annular detonation chamber having an inner wall, an outer wall, an inlet and an outlet;
   a valve plate at the inlet of the annular detonation chamber and comprising a plurality of openings spaced around the inlet;
   a plurality of tubes each having an open end in communication with a corresponding opening of the valve plate and a closed end forming a tuned cavity, and a first opening between the open end and the closed end for injection of air; and
   a plurality of fuel injectors corresponding to the plurality of tubes, each fuel injector being configured to inject fuel into corresponding one of the plurality of tubes between the first opening and the open end to form a fuel/air mixture, wherein each of the tuned cavities has a length sized to resonate at a same frequency as an effective continuous detonation frequency of at least one detonation wave in the annular detonation chamber, wherein the closed end of each of the plurality of tubes comprises a piston configured to adjust the length of the tuned cavity; and wherein a controller is configured to control a position of the piston to change the length of the tuned cavity to match the detonation frequency as a fuel/air mixture temperature at the inlet changes.

2. A rotating detonation combustion system according to claim 1, further comprising:

a controller configured to control the fuel injectors to inject fuel into the tubes in a phased relationship of the at least one detonation wave in the annular detonation chamber.

3. The rotating detonation combustion system according to claim 2, wherein the controller turns on the fuel injectors in a pattern that rotates in synchronization with the at least one detonation wave with a phase lag.

4. The rotating detonation combustion system according to claim 3, wherein the phase lag is configured to allow the fuel/air mixture to propagate into the annular detonation chamber.

5. The rotating detonation combustion system according to claim 3, wherein the controller turns off the fuel injectors upstream of the detonation wave to prevent the flame from prorogating into corresponding one of the plurality of tubes.

6. The rotating detonation combustion system according to claim 1, wherein the length of each of the tuned cavities is configured to return a pressure wave in corresponding one of the plurality of tubes in phase with the at least one detonation wave to reduce ingestion of burnt fuel/air mixture into the tubes.

7. The rotating detonation combustion system according to claim 1, further comprising:

an igniter configured to ignite the fuel/air mixture.

8. The rotating detonation combustion system according to claim 1, wherein the first opening of each tube is generally positioned at a pressure antinode of a static pressure wave in each one of the plurality of tubes.

9. The rotating detonation combustion system according to claim 1, wherein the inner wall and the outer wall of the annular detonation chamber are conical.

10. The rotating detonation combustion system according to claim 1, wherein the inner wall and the outer wall of the annular detonation chamber are curved.

11. The rotating detonation combustion system according to claim 1, wherein each one of the plurality of tubes has a circular cross section.

12. The rotating detonation combustion system according to claim 1, wherein each one of the plurality of tubes has a square cross section.

13. The rotating detonation combustion system according to claim 1, wherein the closed end of each one of the plurality of tubes has a smaller cross section than corresponding one of the plurality of openings in the valve plate.

14. The rotating detonation combustion system according to claim 1, wherein the closed end of each one of the plurality of tubes has a larger cross section than corresponding one of the plurality of openings in the valve plate.

15. The rotating detonation combustion system according to claim 1, wherein the openings in the valve plate are circular.

16. The rotating detonation combustion system according to claim 1, wherein the openings in the valve plate are square.

17. The rotating detonation combustion system according to claim 1, wherein the fuel injectors are configured to inject fuel flows into the air to create mixtures with an equivalence ratio of between about 0.4 to about 1.4.

18. The rotating detonation combustion system according to claim 3, wherein the controller controls the fuel injectors to create a fuel-free leading injection region that creates a buffer between a burned filet/air mixture and a fresh fuel/air mixture entering the detonation chamber.

19. A method of combustion, comprising:

introducing a plurality of fuel/air plumes into an annular chamber from a plurality of tubes at in inlet side of the annular chamber, each of the plurality of tubes having an open end at the inlet side and a dosed end opposite the open end forming a tuned cavity;

igniting a fuel/air mixture formed by the plumes to generate at least one detonation wave in the annular chamber, wherein each of the tuned cavities has a length sized to resonate at a same frequency as an effective continuous detonation frequency of the at least one detonation wave in the annular chamber;

adjusting the length of the tuned cavity of each of the plurality of tubes by moving a piston located at the closed end; and controlling a position of the piston to change the length of the tuned cavity to match the detonation frequency as a fuel/air mixture temperature at the inlet side changes.

20. A method according to claim 19, further comprising:

controlling a plurality of fuel injectors corresponding to the plurality of tubes to inject fuel into corresponding one of the plurality of tubes in a phased relationship of the at least one detonation wave in the annular chamber.

21. A method according to claim 20, wherein controlling the plurality of fuel injectors comprises turning on the fuel injectors in a pattern that rotates in synchronization with the at least one detonation wave with a phase lag.

22. A method according to claim 21, wherein the phase lag is configured to allow the fuel/air mixture to propagate into the annular chamber.

23. A method according to claim 21, further comprising:

turning off the fuel injectors upstream of the at least one detonation wave to prevent the flame from propagating into the tubes.

24. A method according to claim 19, further comprising:

returning a pressure wave in the plurality of tubes in phase with the at least one detonation wave to reduce ingestion of burnt fuel/air mixture into corresponding one of the plurality of tubes.

25. A method according to claim 19, further comprising:

injecting air into each of the plurality of tubes generally at a pressure antinode of a static pressure wave in corresponding one of the plurality of tubes.

26. A method according to claim 25, wherein the air is injected continuously.

27. A method according to claim 19, further comprising:

injecting a fuel/air mixture into each of the plurality of tubes generally at a pressure antinode of a static pressure wave in corresponding one of the plurality of tubes.

28. A method according to claim 27, wherein the fuel/air mixture is lean.

29. A method according to claim 19, further comprising:

arresting the at least one detonation wave from travelling down each of the plurality of tubes.

30. A method according to claim 19, further comprising:

introducing the fuel/air plumes at an acute angle to the at least one detonation wave to impart momentum to the fuel/air plume.

31. A rotating detonation combustion system, comprising;

an annular detonation chamber having an inner wall, an outer wall, an inlet and an outlet; a valve plate at the inlet of the annular detonation chamber and comprising a plurality of openings spaced around the inlet;

a plurality of tubes corresponding to the plurality of openings, each of the plurality of tubes having an open end in communication with a corresponding opening of the valve plate and a closed end forming a tuned cavity, and a first opening between the open end and the closed end for injection of air; and a plurality of fuel injectors corresponding to the plurality of tubes, each fuel injector being configured to inject fuel into corresponding one of the plurality of tubes between the first opening and the open end to form a fuel/air mixture, wherein each of the tuned cavities has a length sized to resonate at a same frequency as an effective continuous detonation frequency of at least one detonation wave in the annular detonation chamber, wherein the closed end of each of the plurality of tubes comprises a piston configured to adjust the length of the tuned cavity; and wherein a controller is configured to control a position of the piston to change the length of the tuned cavity to match the detonation frequency as a fuel/air mixture temperature at the inlet changes.

32. A rotating detonation combustion system according to claim 31, further comprising:

a controller configured to control the fuel injectors to inject fuel into the tubes in a phased relationship of the at least one detonation wave in the annular detonation chamber.

33. The rotating detonation combustion system according to claim 32, wherein the controller turns on the fuel injectors in a pattern that rotates in synchronization with the at least one detonation wave with a phase lag.

34. The rotating detonation combustion system according to claim 33, wherein the phase lag is configured to allow the fuel/air mixture to propagate into the annular detonation chamber.

* * * * *